(12) United States Patent
Geiger et al.

(10) Patent No.: US 8,608,229 B2
(45) Date of Patent: Dec. 17, 2013

(54) MOTOR VEHICLE HAVING INTERCONNECTED OUTER SKIN COMPONENTS AND A METHOD FOR CONNECTING OUTER SKIN COMPONENTS

(75) Inventors: Michael Geiger, Hebertshausen (DE); Helmut Mueller, Tuntenhausen (DE); Werner Reiprich, Bergkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 22 days.

(21) Appl. No.: 13/372,113

(22) Filed: Feb. 13, 2012

(65) Prior Publication Data

US 2012/0139294 A1    Jun. 7, 2012

Related U.S. Application Data

(63) Continuation of application No. PCT/EP2010/064042, filed on Sep. 23, 2010.

(30) Foreign Application Priority Data

Sep. 26, 2009 (DE) .......................... 10 2009 043 102

(51) Int. Cl.
| | |
|---|---|
| B62D 27/02 | (2006.01) |
| B32B 37/12 | (2006.01) |
| B32B 38/10 | (2006.01) |
| B32B 37/02 | (2006.01) |

(52) U.S. Cl.
USPC ........................ 296/181.1; 296/191; 52/794.1

(58) Field of Classification Search
USPC ................. 296/181.1, 181.3, 186.1, 191, 29; 410/115, 106, 108, 109, 113; 52/309.3, 52/309.4, 586.2, 794.1
See application file for complete search history.

(56) References Cited

U.S. PATENT DOCUMENTS

| | | | |
|---|---|---|---|
| 3,141,697 A | * | 7/1964 | Tenenbaum et al. ....... 296/186.1 |
| 3,398,496 A | | 8/1968 | Mischke |
| 4,156,054 A | | 5/1979 | Gurewitsch |
| 4,184,302 A | * | 1/1980 | Gurewitsch et al. ............ 52/578 |
| 4,904,017 A | | 2/1990 | Ehrlich |
| 5,022,208 A | | 6/1991 | Ehrat et al. |
| 5,698,056 A | * | 12/1997 | Kamiyama et al. ........... 156/218 |

(Continued)

FOREIGN PATENT DOCUMENTS

| | | |
|---|---|---|
| DE | 1 400 787 | 12/1968 |
| DE | 37 37 210 A1 | 5/1989 |
| DE | 38 11 427 A1 | 10/1989 |

(Continued)

OTHER PUBLICATIONS

German Search Report dated Jul. 16, 2010 including partial English-language translation (Nine (9) pages).
International Search Report dated Nov. 23, 2010 including English-language translation (Six (6) pages).

*Primary Examiner* — Glenn Dayoan
*Assistant Examiner* — Sunsurraye Westbrook
(74) *Attorney, Agent, or Firm* — Crowell & Moring LLP

(57) ABSTRACT

A motor vehicle having interconnected outer skin components and a method for connecting outer skin components is provided. In cutting off damaged outer skin components and replacing same, in a connected state of the two outer skin components, a reinforcing component is arranged on an inner surface of each of the two outer skin components via an adhesive. This results in a two-layer construction at the joint between the two outer skin components.

16 Claims, 9 Drawing Sheets

(56) References Cited

U.S. PATENT DOCUMENTS

| | | | |
|---|---|---|---|
| 5,853,511 A | * | 12/1998 | Fairbanks ................. 156/71 |
| 6,959,959 B1 | * | 11/2005 | Roush ...................... 296/186.1 |
| 6,974,179 B2 | * | 12/2005 | Grimm et al. ............. 296/191 |
| 7,152,912 B1 | * | 12/2006 | Roush et al. ............. 296/186.1 |
| 7,422,270 B2 | * | 9/2008 | Graaff et al. ............. 296/186.1 |

| | | |
|---|---|---|
| 2007/0283646 A1 | 12/2007 | Ehrlich |

FOREIGN PATENT DOCUMENTS

| | | |
|---|---|---|
| DE | 196 05 928 A1 | 8/1997 |
| DE | 103 36 589 B3 | 5/2005 |
| EP | 0 360 741 A2 | 3/1990 |

\* cited by examiner

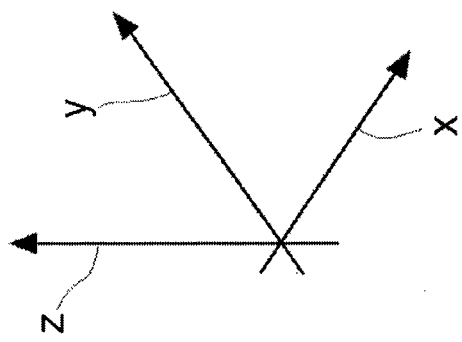
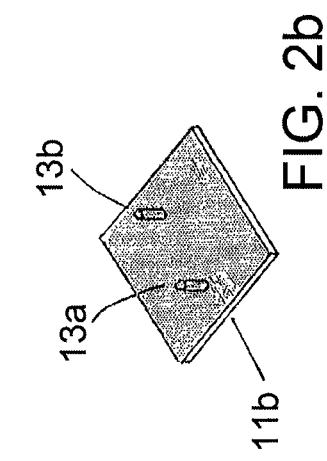
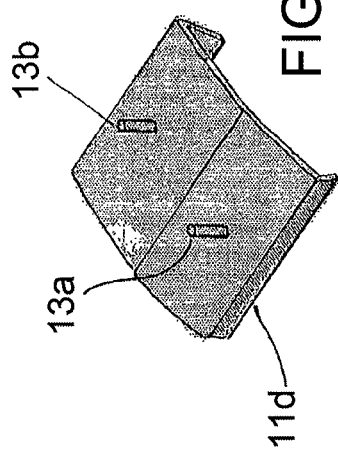
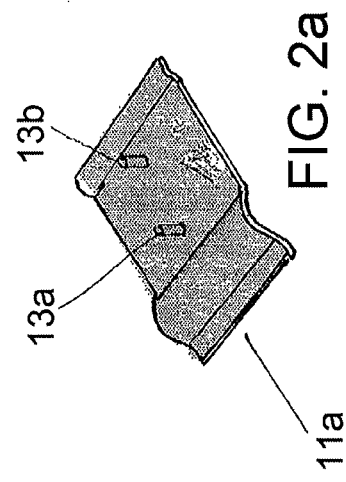
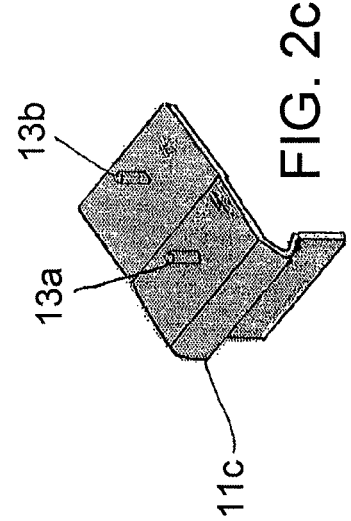
FIG. 2a  FIG. 2b  FIG. 2c  FIG. 2d

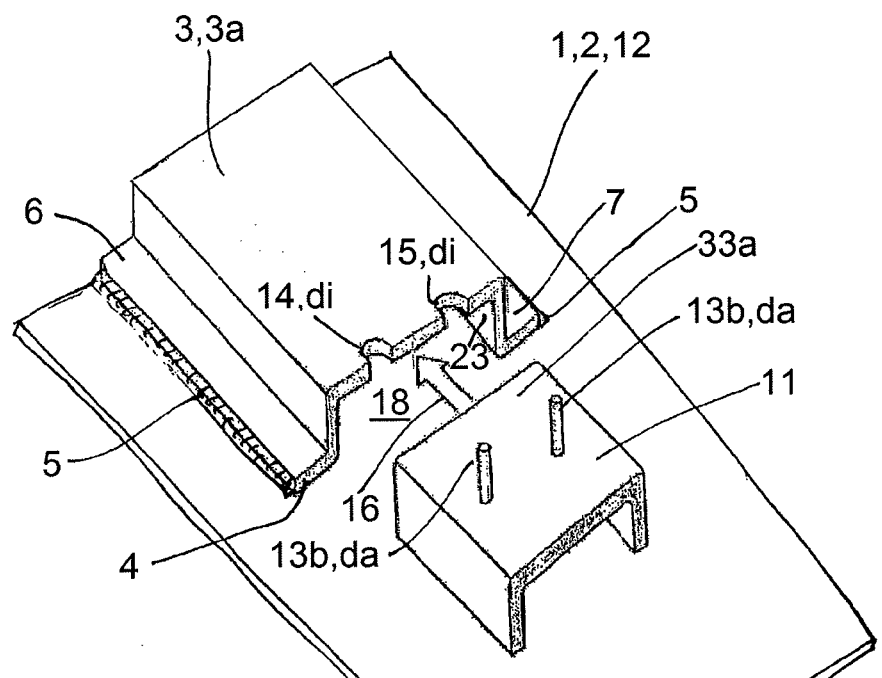
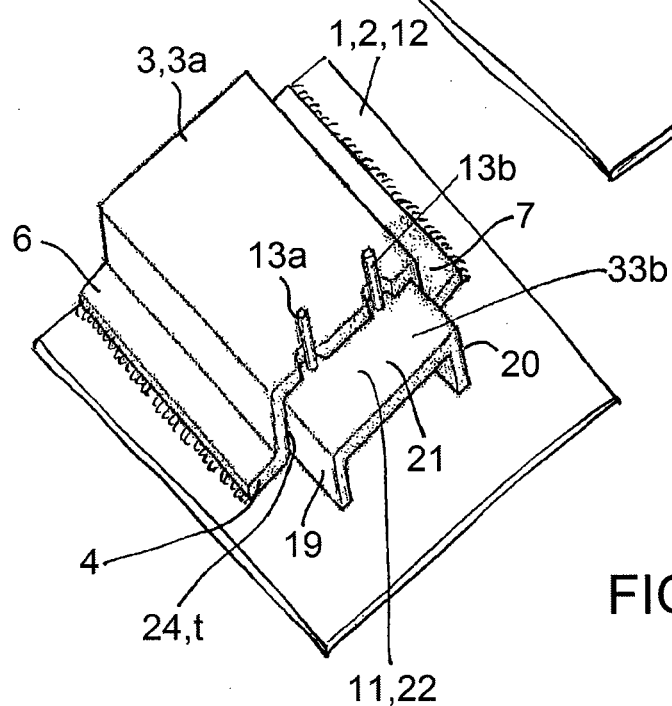
FIG. 3
FIG. 4

MOTOR VEHICLE HAVING INTERCONNECTED OUTER SKIN COMPONENTS AND A METHOD FOR CONNECTING OUTER SKIN COMPONENTS

CROSS-REFERENCE TO RELATED APPLICATIONS

This application is a continuation of PCT International Application No. PCT/EP2010/064042, filed Sep. 23, 2010, which claims priority under 35 U.S.C. §119 from German Patent Application No. DE 10 2009 043 102.0, filed Sep. 26, 2009, the entire disclosures of which are herein expressly incorporated by reference.

BACKGROUND AND SUMMARY OF THE INVENTION

The invention relates to a motor vehicle having interconnected outer skin components and a method for connecting outer skin components.

It is already known to connect together the outer skin components of a vehicle body by welding, adhesively cementing or riveting. When a new outer skin component is to be connected to an outer skin component that is already on a finished vehicle body, a great deal of effort may be required for the assembly work.

The object of the invention is to provide a motor vehicle having interconnected outer skin components that exhibit a simple construction. An additional object of the invention is to provide a simple method for connecting the outer skin components.

This and other engineering objects are achieved with the inventive motor vehicle having interconnected outer skin components and the inventive method for connecting outer skin components.

In a motor vehicle according to the invention a vehicle body has a body-in-white with its structural components. Outer skin components are disposed on the structural components. Following removal of a section of an outer skin component that is to be replaced, there is an area that is not covered at the joint. A new outer skin component is then arranged on the remaining outer skin component of the vehicle body. The two outer skin components abut against each other at their opposing outer edges. In the connected state of the two outer skin components, a reinforcing component is arranged in an advantageous way on an inner surface of each of the two outer skin components by use of an adhesive, so that the result is a two-layer construction at the joint. The connection of both outer skin components exhibits the required strength due to the reinforcing component.

In one advantageous embodiment the outer skin components and the reinforcing component are made of one material.

In an additional advantageous embodiment the respective outer skin components and the reinforcing component are made of different materials.

The material of the respective outer skin components and the respective reinforcing component consists advantageously of a synthetic plastic material or metal.

In an advantageous embodiment at least one stud bolt or at least one screw is disposed on the reinforcing component, wherein the respective stud bolt or the respective screw has an outward-projecting threaded portion.

The outer skin components exhibit advantageous recesses for accommodating the respective stud bolt or the respective screw.

An inventive method for connecting the vehicle body parts includes advantageously the following acts:

1. removing a section of an outer skin component disposed on the vehicle body,
2. adapting a reinforcing component to the remaining outer skin component and adapting a new outer skin component to be installed,
3. adhesively cementing the reinforcing component to the remaining outer skin component,
4. adhesively cementing the new outer skin component to the reinforcing component, and
5. securing the outer skin components at the joint by means of a screw connection using stud bolts disposed on the reinforcing component, and with nuts screwed together with the stud bolts.

In one advantageous working step the new outer skin component is adhesively cemented in an advantageous way to the reinforcing component and to a structural component of a vehicle body.

The new outer skin component is aligned advantageously relative to the opposing outer skin component, which is fastened to the vehicle body, in the specified connecting position and then secured with suitable tools.

After the adhesive has cured, the nuts are removed in one advantageous working step, and the portions of the stud bolts or screws that project beyond the outer surface of the outer skin components are cut off.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2a-2d are perspective views of four different reinforcing components exhibiting a shape that is adapted to the cross-section of an outer skin component that is to be separated;

FIG. 3 is a perspective view of an outer skin component that is fastened, for example, to a vehicle body and that is separated at the interface, shown in FIG. 1, and a reinforcing component with stud bolts prior to fitting to the rigidly attached outer skin component;

FIG. 4 is a perspective view of the reinforcing component inserted at the outer skin component of FIG. 3;

DETAILED DESCRIPTION OF THE DRAWINGS

Figure 1:
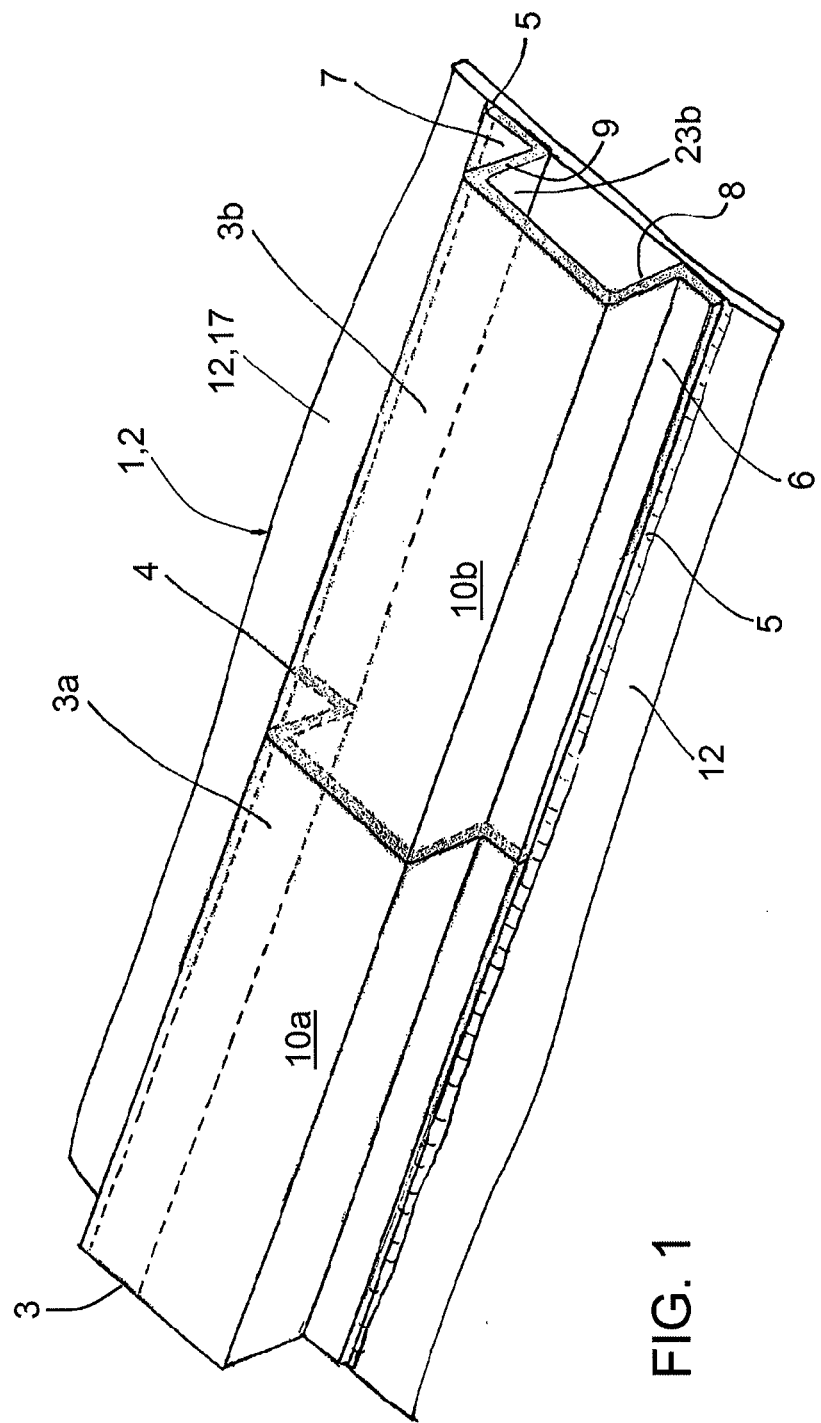
FIG. 1 is a perspective view of a section of an outer skin component that is to be separated at a predetermined interface.

FIG. 1 is a perspective view of an outer skin component 3 of a body 2 (not shown in detail) of a motor vehicle 1. The outer skin component 3 is to be separated at an interface 4. For example, a right section 3b of the outer skin component 3 may be damaged and has to be replaced with a new outer skin component 3c.

The outer skin component 3 has, for example, a hat-shaped cross section. In the illustrated embodiment the outer skin component 3 consists of two lateral flanges 6 and 7, a side wall 8, 9 that is connected to each flange, and a wall section 10 connecting the two side walls 8, 9. The two lateral flanges 6 and 7 are fastened to a structural component 12 of the body 2 of the motor vehicle 1, for example, by way of a weld connection or an adhesive bond, as shown by the welds or by the emerging adhesive 5.

FIGS. 2a-2d show four different embodiments of the reinforcing components 11a, 11b, 11c and 11d having a size and shape that is dependent on the respective outer skin component 3 and the specified fastening point. Such outer skin components 3 include, for example, outer roof sections, pillar sections and sill sections. Each embodiment of the reinforcing components 11a, 11b, 11c and 11d that are shown in FIG. 2 has two outward-projecting stud bolts 13a, 13b, each of which exhibits a threaded portion.

Following removal of the right section 3b of the outer skin component 3, the new outer skin component 3c can be installed at the left section 3a of the outer skin component 3. The left section 3a of the outer skin component 3 is referred to hereinafter as the outer skin component 3a. FIG. 3 is a perspective view of the outer skin component 3a from the top. The outer skin component 3a has two semicircular recesses 14, 15 for the two stud bolts 13a, 13b. The recesses 14, 15 have, for example, an inside diameter $d_i$, where $d_i$ is 9 mm≤$d_i$≤12 mm, and the stud bolts 13a, 13b have an outside diameter $d_a$, where $d_a$ is 4 mm≤$d_a$≤8 mm.

A reinforcing component 11 is pushed, according to the arrow 16 in FIG. 3, into the cavity 18, formed by the side walls 8, 9, the wall section 10 and the outer surface 17 of the vehicle body 2. The end position of the reinforcing component 11 at the outer skin component 3a is reached when the stud bolts 13a, 13b impinge on the respective recesses 14, 15, as shown in FIG. 4.

The reinforcing component 11 has opposing side walls 19, 20 and a wall section 21, which connects the side walls 19, 20 and has an outer surface 22. Between the outer surface 22 of the reinforcing component 11 and the opposing inner surface 23 of the outer skin component 3a there is a gap 24 exhibiting a predefined distance t. The distance t is 2 mm≤t≤4 mm.

Figure 5:
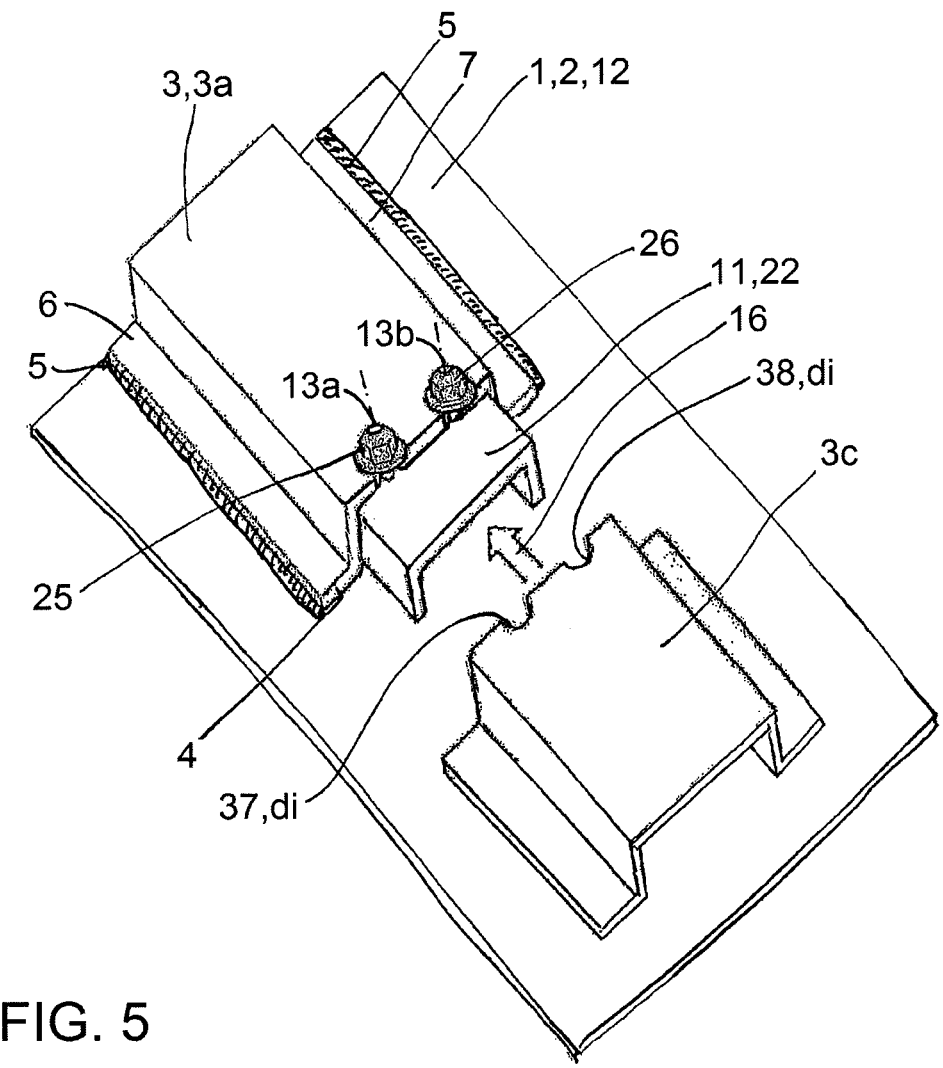
FIG. 5 is a perspective view of the rigidly attached outer skin component, to which the reinforcing component is fastened with nuts, and a second outer skin component, which is to be disposed on the reinforcing component.

It is apparent from FIG. 5 that the reinforcing component 11 is fastened by use of the respective stud bolts 13a, 13b, the wall section 10a of the outer skin component 3a and a nut 25, 26 with the associated washers or by means of a cap nut.

Then, a new outer skin component 3c is pushed, according to the arrow 16 in FIG. 5, in the direction of the fastened outer skin component 3a and the reinforcing component 11. The new outer skin component 3c exhibits preformed recesses 37, 38 having the same inside diameter $d_i$ as the recesses 14, 15. In this working step, the new outer skin component 3c is adapted to the interface 4 of the left outer skin component 3a.

Figure 6:
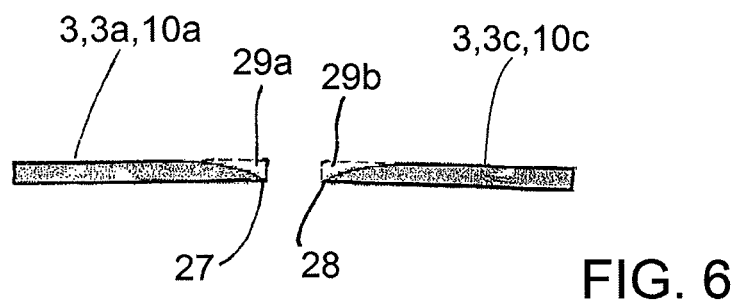
FIG. 6 is a side view of a longitudinal section of a front section of the rigidly attached outer skin component and the new outer skin component, which is to be installed, wherein the opposing end faces of the respective front sections of the outer skin components have been rounded-off to form a joint.
Figure 7:
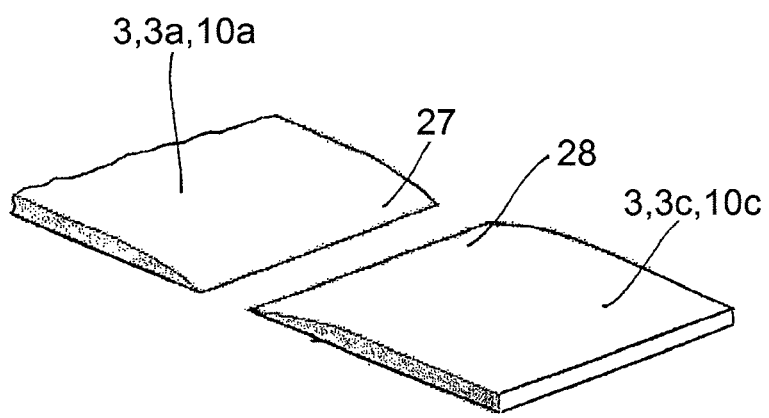
FIG. 7 is a perspective view of both opposing front sections (shown in FIG. 6) of the outer skin components that are to be connected together.

FIGS. 6 and 7 show the opposing end faces 27, 28 of the outer skin component 3a and the new outer skin component 3c, after the end faces 27, 28 have been rounded off in one working step. The volume of removed material of the outer skin components 3a and 3c produces a cavity 29a, 29b or, more specifically in the connected state of the outer skin components 3a and 3c, a joint 29 that serves to hold excess adhesive 30 and/or to hold a joint compound 31.

Figure 8:
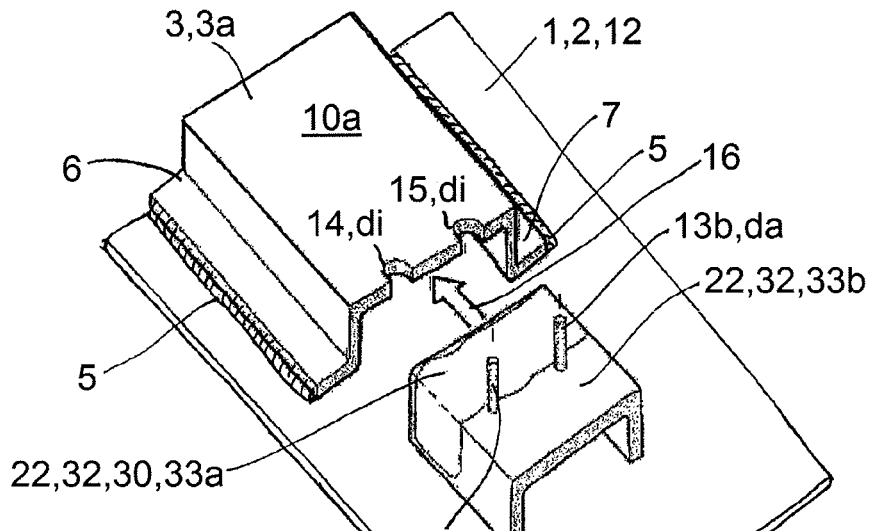
FIG. 8 is a perspective view according to FIG. 3, wherein an adhesive is applied to the outer surface of the reinforcing component that makes contact with an inner surface of the rigidly attached outer skin component.

In the next working step at least the respective outer surface 22 of the reinforcing component 11 that serves as the adhesive surface 32 and the respective inner surface 23 of the outer skin component 3a as well as of the new outer skin component 3c are cleaned. Then, the adhesive 30 is applied to the area 33a of the outer surface 22 of the reinforcing component 11, as shown in FIG. 8.

Thereafter, the reinforcing component 11 is pushed, according to the arrow 16, into the cavity 29a of the left section 3a of the outer skin component 3 in such a way that the end faces 27, 28 of the side walls 8, 9 and of the wall section 10 of the section 3a of the outer skin component 3 do not rub off the adhesive 30 that is applied to the side walls 19, 20 and the wall section 21 of the reinforcing component 11 in the illustrated embodiment.

Figure 9:
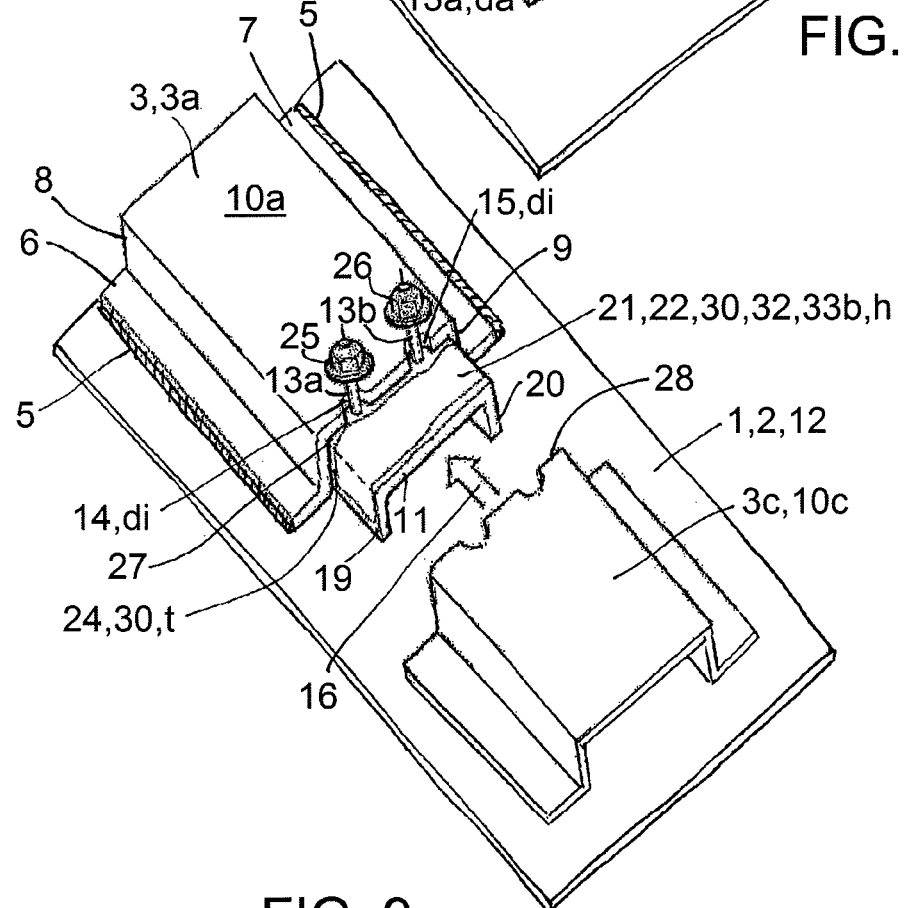
FIG. 9 is a perspective view according to FIG. 5, where an adhesive is applied to the respective outer surface of the reinforcing component that projects from the rigidly attached outer skin component, and, in addition, the new outer skin component that is to be installed is shown.

In FIG. 9, the stud bolts 13a, 13b of the reinforcing component 11 are in the recesses 14, 15 of the outer skin component 3a. The cap nuts 25, 26, which are used in the illustrated embodiment, are screwed on until the reinforcing component 11 is secured in its position, and at the same time the specified height h of the applied adhesive 30 is maintained. The height h of the applied adhesive 30 is, for example, 1 mm≤h≤3 mm.

Then adhesive 30 is applied in the requisite amount and height h to the area 33b of the outer surface 22 of the side walls 19, 20 and of the wall section 21 that serves as the adhesive surface 32. The new outer skin component 3c is then moved, according to the arrow 16, onto the adhesive surface 32 of the reinforcing component 11.

Figure 10:
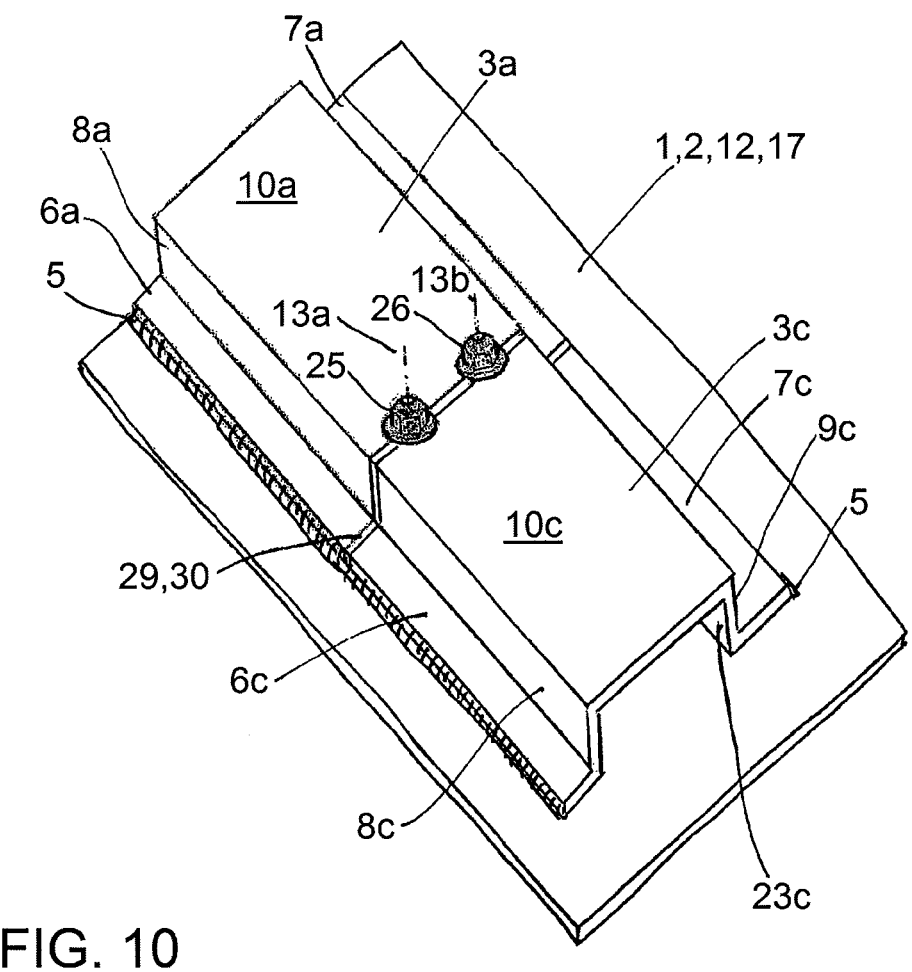
FIG. 10 is a perspective top view of the outer skin components that are adhesively cemented together in such a way that their position is secured by nuts screwed on the stud bolts of the reinforcing component.

In FIG. 10 the new outer skin component 3c is in the specified connecting position. Before arranging the new outer skin component 3c at the outer skin component 3a, adhesive 30 is also applied to the side flanges 6c and 7c of the new outer skin component 3c for the purpose of fastening to the structural component 12.

In the specified connecting position the new outer skin component 3c is aligned relative to the opposing outer skin component 3a, which is fastened to the vehicle body 2, and then secured with tools, such as pliers, which are not illustrated. Then the provided nuts 25, 26 on the stud bolts 13a, 13b are tightened with the specified torque.

The arrangement of the new outer skin component 3c must ensure that the conditions for a smooth and seamless transition of the outer skin components 3a and 3c at the interface or joint 4 are met. A correct spatial arrangement is possible only prior to curing the adhesive 30. After the adhesive 30 has cured, the connection of the new outer skin component 3c to the outer skin component 3a by way of the reinforcing component 11 and to the outer surface 17 of the structural component 12 or to any other component of the vehicle body 2 is complete.

Figure 11:
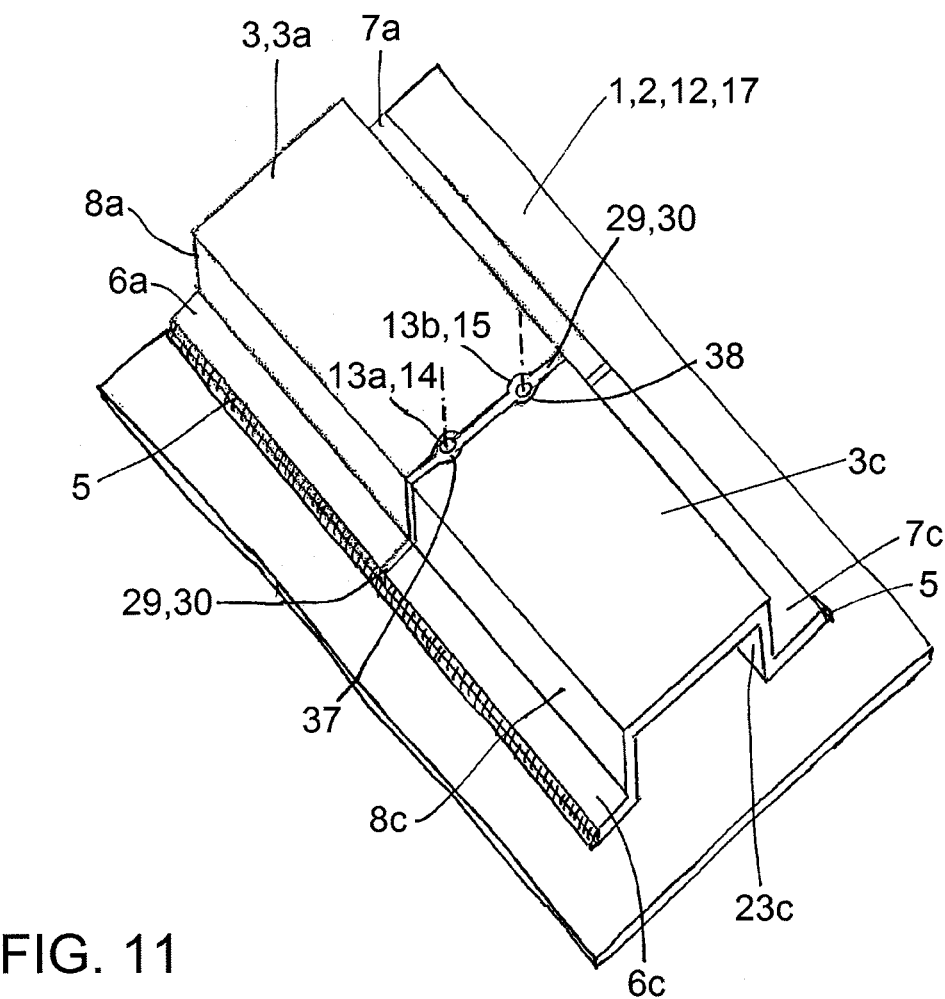
FIG. 11 is a perspective top view of the two interconnected outer skin components after the adhesive cured, the screwed on nuts and the stud bolts were removed.

It is apparent from FIG. 11 that, in an additional working step, the nuts 25, 26 were removed, and the projecting portions of the stud bolts 13a, 13b were cut off with a tool, for example, a vehicle body saw. Furthermore, the rest of the adhesive 30 that was still in the gap or the joint 29 was totally removed. Any existing sharp edges on the end faces 27, 28 of the outer skin components 3a and 3c were rounded out, for example, by grinding.

Figure 12:
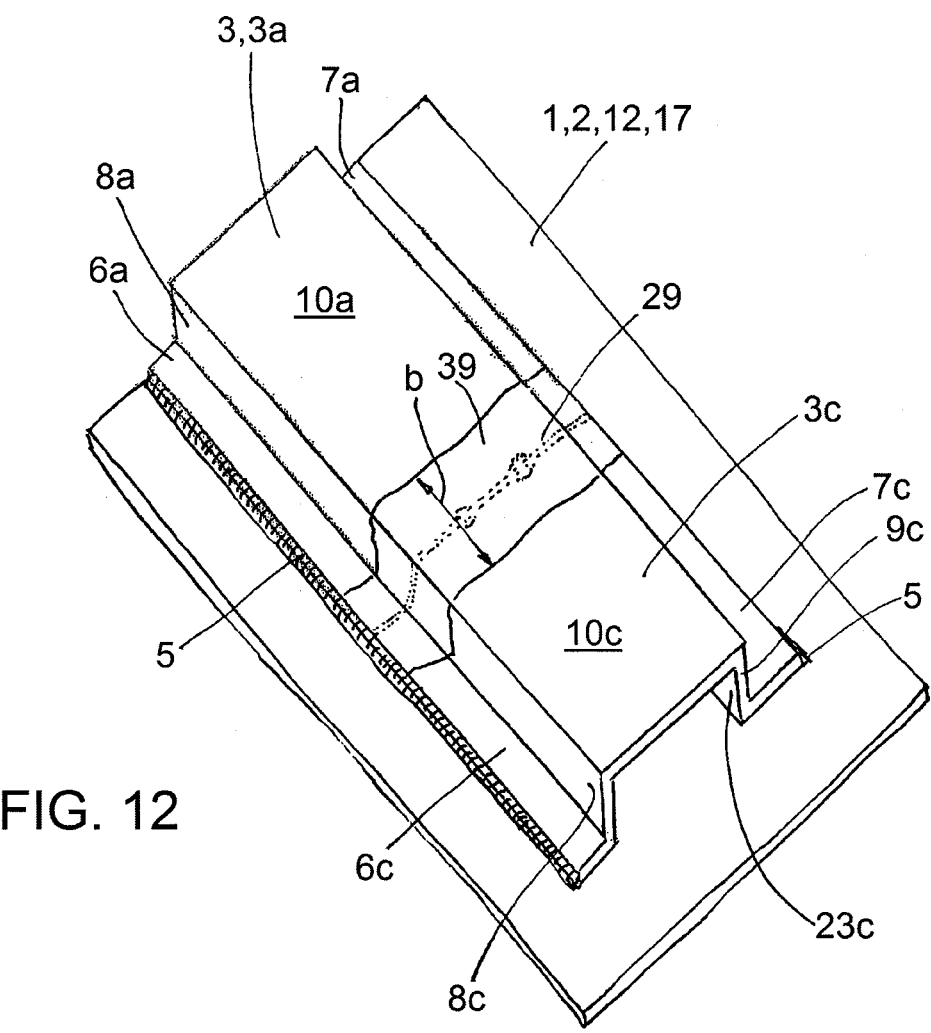
FIG. 12 is a perspective top view of the two interconnected outer skin components, and in FIG. 12 the joint has been filled with joint compound.

Finally the gap 29 is filled with a curable joint compound 31. In the illustrated embodiment the joint compound 31 is a metal joint compound. As evident from FIG. 12, the joint compound 31 covers large areas of the gap 29. The joint compound 31 is applied in the gap 29 with a small excess of material. Furthermore, the edge areas of the gap 29 are also covered over a surface area 39 having a width b. After curing and abrasive finishing of the joint compound 31, the new outer skin component 3c and the surface area 39, filled with joint compound, are painted in additional working steps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle body with a body-in-white having structural components, comprising:
   first and second outer skin components disposed on a structural component, the first and second outer skin components abutting against one another at a joint between non-overlapping opposing outer edges in a connected state; and
   a reinforcing component arranged on an inner surface of each of the first and second outer skin components via an adhesive in the connected state, the joint between the first and second outer skin components having a two-layer construction consisting of a first layer formed by the reinforcing component and a second adjacently-located layer formed by the non-overlapping first and second outer skin components, respectively.

2. The motor vehicle according to claim 1, wherein the first and second outer skin components and the reinforcing component are made of a same material.

3. The motor vehicle according to claim 1, wherein the first and second outer skin components are made of a material different from that of the reinforcing component.

4. The motor vehicle according to claim 1, wherein a material of the first and second outer skin components and the reinforcing component arranged at the joint is one of a synthetic plastic material and a metal.

5. The motor vehicle according to claim 1, further comprising:
   at least one elongated fastener disposed on the reinforcing component and extending outward, an outwardly-extending portion of the fastener having a threaded portion.

6. The motor vehicle according to claim 5, wherein the fastener is one of a stud bolt and a screw.

7. The motor vehicle according to claim 5, wherein the first and second outer skin components have corresponding recesses for accommodating the fastener, which extends through the recesses.

8. The motor vehicle according to claim 6, wherein the first and second outer skin components have corresponding recesses for accommodating the fastener, which extends through the recesses.

9. A method for repairing vehicle body parts, the method comprising the acts of:
   removing a section of an outer skin component disposed on the vehicle body;
   adapting a reinforcing component to a remaining section of the outer skin component and adapting a new outer skin component to be installed;
   adhesively cementing the reinforcing component to the remaining section of the outer skin component;
   abutting the remaining section and the new outer skin component against one another at a joint between non-overlapping opposing outer edges thereof, wherein the joint between the remaining section and the new outer skin component has a two-layer construction consisting of a first layer formed by the reinforcing component and a second adjacently-located layer formed by the non-overlapping remaining section and new outer skin component, respectively;
   adhesively cementing the new outer skin component to the reinforcing component; and
   securing the remaining section and new outer skin component at an interface by a threaded connector.

10. The method according to claim 9, wherein the threaded connector is disposed on the reinforcing component and secures the outer skin components at the interface via at least one nut screwed onto a stud bolt of the threaded connector.

11. The method according to claim 9, wherein the new outer skin component is adhesively cemented to the reinforcing component and to a structural component of the vehicle body.

12. The method according to claim 9, further comprising the acts of:
   aligning the new outer skin component relative to the remaining outer skin component in a specified connecting position, the remaining outer skin component being fastened to the vehicle body; and
   securing the aligned new outer skin component via a defined tool.

13. The method according to claim 10, further comprising the acts of:
   aligning the new outer skin component relative to the remaining outer skin component in a specified connecting position, the remaining outer skin component being fastened to the vehicle body; and
   securing the aligned new outer skin component via a defined tool.

14. The method according to claim 13, further comprising the acts of:
   after curing the adhesive, removing the nut and at least portions of the stud bolt projecting beyond an outer surface of the outer skin components.

15. The motor vehicle according to claim 7, wherein the corresponding recesses are formed into the opposing outer edges of the first and second outer skin components.

16. The method according to claim 9, prior to said adhesively cementing the reinforcing component to the remaining section of the outer skin component, further comprising inserting the reinforcing component into a cavity formed between the remaining section of the outer skin component and the vehicle body.

* * * * *